(12) United States Patent
Menke et al.

(10) Patent No.: US 7,402,763 B2
(45) Date of Patent: Jul. 22, 2008

(54) MIM FORCE MEASURING DEVICE

(75) Inventors: Oliver Menke, Wolfsegg (DE); Franz Stadler, Langquaid (DE)

(73) Assignee: Siemens Aktiengesellschaft, Munich (DE)

( * ) Notice: Subject to any disclaimer, the term of this patent is extended or adjusted under 35 U.S.C. 154(b) by 12 days.

(21) Appl. No.: 10/591,488

(22) PCT Filed: Jan. 24, 2005

(86) PCT No.: PCT/EP2005/050286

§ 371 (c)(1),
(2), (4) Date: Sep. 1, 2006

(87) PCT Pub. No.: WO2005/085777

PCT Pub. Date: Sep. 15, 2005

(65) Prior Publication Data

US 2007/0180930 A1    Aug. 9, 2007

(30) Foreign Application Priority Data

Mar. 3, 2004   (DE) ................. 10 2004 010 367

(51) Int. Cl.
*G01G 3/14* (2006.01)
*G01L 1/04* (2006.01)
(52) U.S. Cl. .................. 177/144; 177/211; 177/229; 73/862.636; 73/862.637
(58) Field of Classification Search ............... 177/144, 177/211, 229; 73/862.636, 862.637
See application file for complete search history.

(56) References Cited

U.S. PATENT DOCUMENTS 3,263,496 A    8/1966  Fathauer 5,183,126 A *  2/1993  Kellenbach ............... 177/211
6,087,598 A    7/2000  Munch
6,089,106 A    7/2000  Patel et al.
7,189,931 B2 * 3/2007  Hida et al. ................ 177/144

FOREIGN PATENT DOCUMENTS

| DE | 100 04 484 A1 | 2/2001 |
| DE | 101 45 370 A1 | 12/2002 |
| GB | 882 989 | 11/1961 |
| JP | 4-370727 | 12/1992 |

OTHER PUBLICATIONS

Johnson, J.L., et al.: "Metal Injection Molding of Multi-Functional Materials", Proceedings of IMECE '03 ASME International Mechanical Engineering Congress, Washington, D.C., Nov. 15-21, 2003.

* cited by examiner

*Primary Examiner*—Randy W Gibson
(74) *Attorney, Agent, or Firm*—Laurence A. Greenberg; Werner H. Stemer; Ralph E. Locher

(57) ABSTRACT

A force sensing device has a single-component metal housing. The housing has an upper rigid housing part and a lower rigid housing part that are interconnected by way of U-shaped spring elements and can be elastically displaced along a displacement axis in relation to each other by the action of a force. The spring elements are symmetrically arranged in relation to a section that is parallel to the displacement axis. A deflection sensor is disposed between the upper and lower rigid housing parts, for detecting the relative displacement of the two rigid housing parts in relation to each other. The housing is produced using metal injection molding technology.

6 Claims, 2 Drawing Sheets

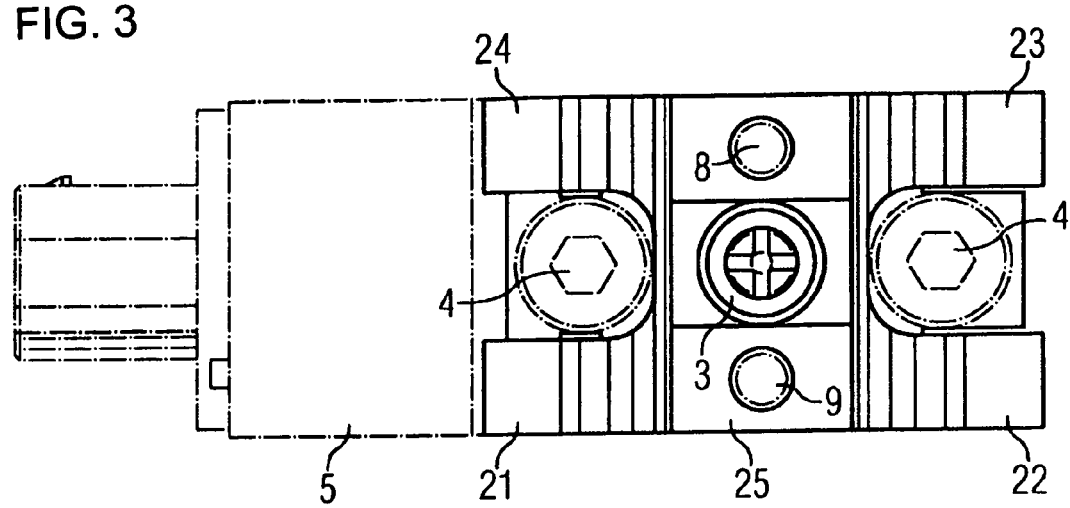
FIG. 3
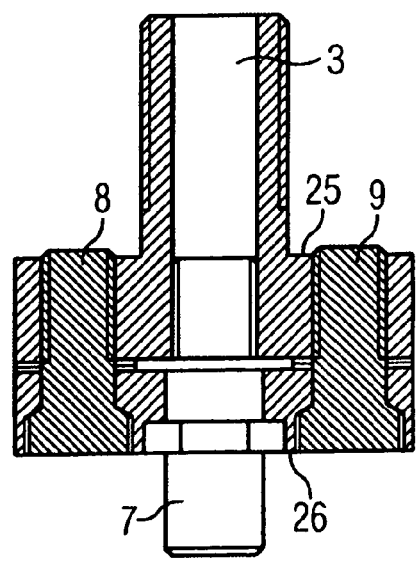
FIG. 4 A-A

MIM FORCE MEASURING DEVICE

BACKGROUND OF THE INVENTION

Field of the Invention

The invention relates to a force measuring device. The force measuring device has a housing manufactured as a single piece and made of metal, with upper and lower rigid housing parts, which can be moved in relation to each other in an elastic manner. A deflection sensor is attached between the two rigid housing parts, which can detect the deflection of the two rigid housing parts in relation to each other and forward it as an electrical signal.

In the field of vehicle occupant protection, it has become increasingly important in recent years to tailor the release of occupant restraint means, for example front airbags, side airbags, knee airbags, curtain airbags, etc. to any vehicle occupants in the deployment zone of the occupant restraint means or even to suppress their release completely, in order on the one hand to avoid subsequent repair costs after unnecessary release, for example if a vehicle seat is unoccupied, and on the other hand not to put certain groups of people at further risk due to an inappropriate release response of the occupant restraint means, for example children or very small adults. It is therefore important not only to determine the presence of a person on a vehicle seat but also to determine classifying characteristics of the person, for example their body weight. Reference should be made in this context to the crash standard FMVSS208, with which vehicle manufacturers are increasingly required to comply and which requires a person to be classified by weight, so that in the event of a collision the activation of an occupant restraint means can if necessary be tailored in the known manner to the identified person.

It is known from the publication DE 100 04 484 A1 that force measuring devices can be disposed between the vehicle seat and the vehicle chassis to identify the weight of a person on a vehicle seat. The housing of the force measuring device can thereby be manufactured as a single piece and made of spring metal, with rigid housing parts (220) and (222) and spring means (232, 234), which connect the rigid housing parts (220, 222) (FIG. 4 and column 8, lines 18 to 27). A deflection sensor is disposed between the two rigid housing parts (220, 222), for example an inductive deflection sensor (190, 192, 194, 196, 198) (FIG. 3), which can detect a deflection of the rigid housing parts (220, 222) and convert it to a measurement signal, which provides information about the force acting on the force measuring device.

The published German patent application DE 101 45 370 A1 discloses a similar force measuring device made of a single-piece metal housing (FIG. 4b and column 6, paragraph [0059]) but with a different sensor principle.

In order for them to be deployed usefully in a motor vehicle, the known force measuring devices have on the one hand to be manufactured such that they are very small, to take into account the limited space between a vehicle seat and the vehicle chassis and on the other hand they have to have an extremely high level of dimensional stability over the entire life of a vehicle, generally at least 15 years, in order to prevent the deflection sensor measuring in a systematically incorrect manner over the course of time where possible. However as far as the known force measuring devices are concerned, these two requirements are conflicting and seem irreconcilable. To achieve a housing with permanent dimensional stability, which can withstand the very large weight loads of up to 1.2 t during operation of a motor vehicle, the housing of the force measuring device has to be extremely solid and quite large. The small space available however requires a filigree, small housing.

SUMMARY OF THE INVENTION

The object of the present invention is to create a force measuring device with a housing with permanent dimensional stability and where possible without hysteresis, which is at the same time very small and simple to manufacture.

The object is achieved by a force measuring device as claimed in claim 1.

Advantageous embodiments are set out in the subclaims, with any expedient combination of features from the subclaims with the main claim coming within the scope of the patent.

The inventive force measuring device comprises a single-piece housing made of metal. The housing comprises an upper rigid housing part and a lower rigid housing part, which are connected together by means of U-shaped spring elements and which can be moved in relation to each other in an elastic manner along a movement axis by the action of a force. The spring elements are disposed symmetrically to each other parallel to the movement axis in relation to a sectional plane. A deflection sensor is attached between the upper and lower rigid housing parts to detect the relative movement of the two rigid housing parts in relation to each other. According to the invention the housing is manufactured using Metal Injection Molding (MIM) technology.

The use of MIM technology has hitherto only been known from other technical fields, see for example a publication by the company Hans Schweiger GmbH, which could be found on Mar. 03, 2004 at http://www.formapulvis.com/Index.htm, in which the MIM production process is described for different areas of application.

With MIM technology, also known as powder metal injection molding, a fine metal powder is mixed with primary binders and granulated, resulting in what is known as feedstock. The feedstock is melted in an injection molding machine and injected in a tool to form a molding. After cooling the components are removed as so-called "green" parts. The binder is then extracted from the green parts in a furnace. The binderless components are now called brown parts and are then sintered in a high-temperature furnace.

MIM technology thereby combines the forming freedom of plastic injection molding with powder metallurgy. The MIM method therefore allows the production of highly integrated metal parts with complex geometries in large numbers with a high level of precision.

The MIM method therefore makes it possible to produce housing walls of very precise thicknesses, thereby achieving very precisely calculated form and thickness characteristics in a metal housing of an inventive force measuring device. This allows a very small, elastic housing to be produced, such that a maximum internal stress of 350 Newton/mm$^2$ is not exceeded at any point of the housing even at a required maximum nominal load of for example 150 kg on the force measuring device and at the same time a deflection of the rigid housing parts in relation to each other of minimum 1 μm per kg of loading weight is achieved.

The fact that the inventive housing is a single piece also means that hitherto complex joining processes between different components of the housing can be avoided, as a result of which hysteresis phenomena in the inventive force measuring device can be significantly reduced—due to the reduced number of joined edges.

Advantageous embodiments of inventive devices are contained in the description of the figures below, in which:

BRIEF DESCRIPTION OF THE DRAWINGS

FIG. 3 shows a top view of the force measuring device according to FIG. 1 and FIG. 4 shows a cross-sectional view of the force measuring device according to FIG. 1 along the sectional plane A-A.

DESCRIPTION OF THE PREFERRED EMBODIMENTS

Figure 1:
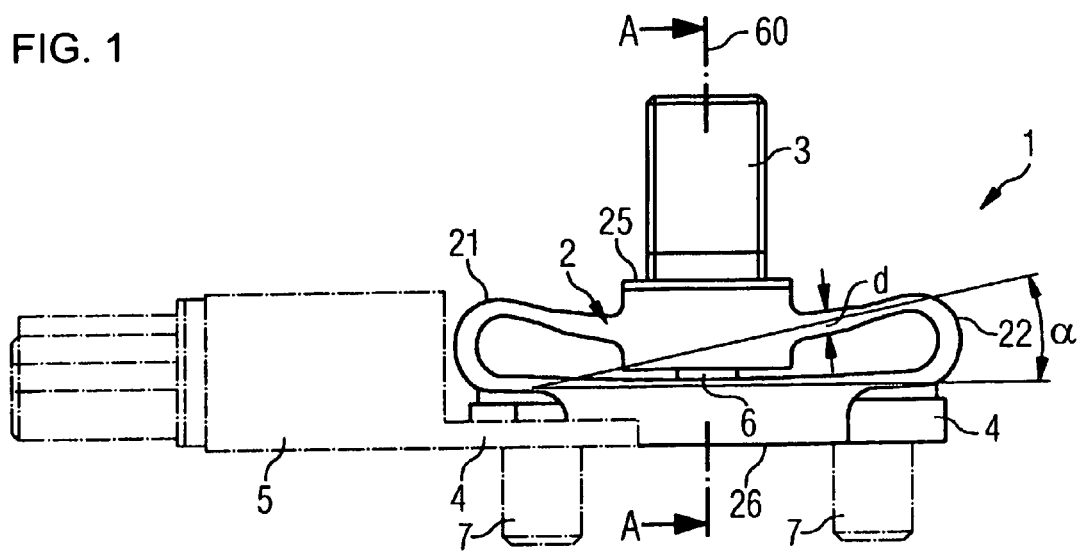
FIG. 1 shows an exemplary embodiment of an inventive force measuring device (1) in cross-section.

FIG. 1 shows an advantageous development of an inventive force measuring device 1, comprising a single-piece housing 2, manufactured using Metal Injection Molding (MIM) technology. The housing has an upper housing part 25 and a lower housing part 26, which are configured in a rigid manner compared with the U-shaped spring elements 21 and 22 connecting the said two housing parts 25, 26, such that these two rigid housing parts 25 and 26 can move to and fro in relation to each other due to the action of a weight force but ideally without becoming deformed themselves. A deflection sensor 6 is attached between the two rigid housing parts 25 and 26, which can detect a relative movement of the two housing parts 25, 26 in relation to each other and convert it to an electrical signal, which is routed via a cable connection (not shown) via a plug connector 5 to an electronic evaluation unit or is processed further in an electronic evaluation unit within the plug connector 5. This signal is fed to an occupant protection device (also not shown), where it is available as information about the weight acting on the force measuring device 1, as a result of which an occupant restraint means is released in an optionally tailored manner.

For the purposes of the desirable low level of mechanical stress in the housing 22, as mentioned above, even subject to the action of a force, which is applied via a force induction means 3 by a vehicle seat to the upper rigid housing part 25 and thus to the force measuring device 1, the arms of the two spring elements 22 and 21 form an acute angle α.

Also for the purposes of a largely regular stress distribution throughout the housing 2 of the force measuring device 1, each of the spring elements tapers from the upper rigid housing part 25 continuously until it achieves a minimum wall thickness d at the start of the bend to the U-curve. From this point the wall thickness increases again around the vertex of the U-curve, reduces again after the turn of the curve and remains constant until the point of transition to the lower rigid housing part 26. As the sectional plane AA represents a plane of symmetry of the spring element, the characteristic of the wall thickness d along the spring element is the same as that of the spring element 22.

The housing 1 shown also has a securing lug 4, in the form of two integral components behind each of the two curved springs 21 and 22 shown respectively, with the aid of which the force measuring device 1 is connected by means of two screws 7 to the vehicle chassis. Other securing means, for example rivets, etc., could also be used instead of screws.

Figure 2:
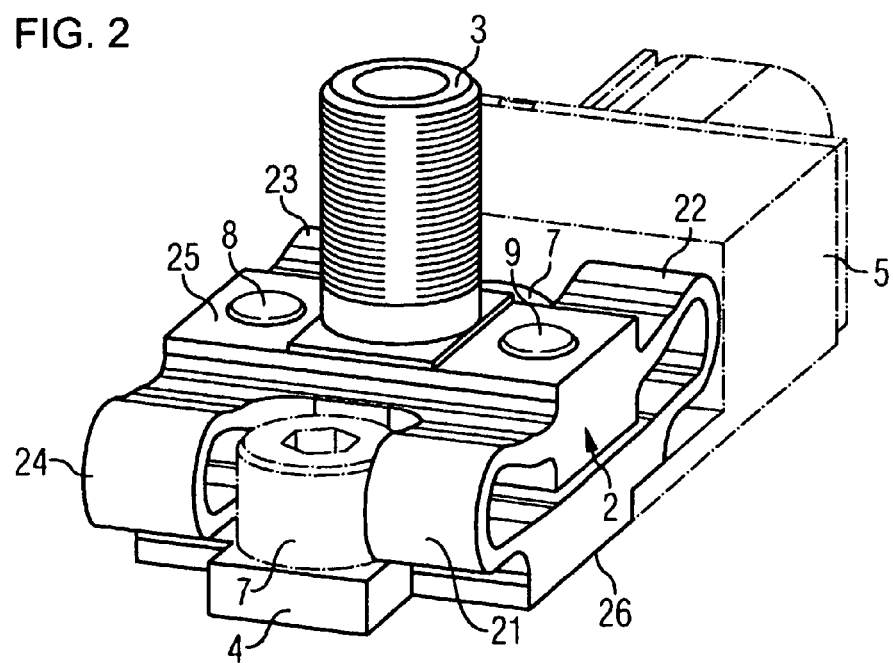
FIG. 2 shows a perspective view of the force measuring device according to FIG. 1.

FIG. 2 shows a perspective view of the force measuring device in FIG. 1. It can be seen that a further pair of U-shaped spring elements 24 and 25 is again disposed in a symmetrical manner around the two rigid housing parts 25 and 26 behind the two securing means 4 with their associated screws 7. It can be seen particularly clearly in this diagram how, with the aid of the option of a very filigree configuration of the housing 2, the four curved springs 21, 22, 23, 24 shown can be made as thin as possible, such that the securing points of the force measuring device 1 can be disposed within the same base area as is taken up by the entire housing 2 and the spring elements 21, 22, 23 and 24. A top view of this base area is also shown in FIG. 4.

FIG. 4 shows a cross-section through the housing 2 of the force measuring device 1 along the line A-A in FIG. 1. This cross-sectional diagram is intended to show the mode of action of additional overload protection elements 8, 9, already shown in the two FIGS. 2 and 3 in a top view of the housing 2. The two overload protection elements 8, 9 are connected permanently to the upper rigid housing part 25, for example by means of a screwed connection. Toward the lower rigid housing part 26, the diameter of each of the two overload protection elements 8 and 9 gradually increases and there is a roughly regular narrow air gap between it and the lower rigid housing part 26.

In this manner the two overload protection elements 8 and 9 move out of the housing 2 as soon as a force acts in the direction of the lower rigid housing part 26 via the force induction means 3. A further deflection of the two rigid housing parts 25 and 26 in relation to each other, if the action of the force increases further, is only prevented, if the two overload protection elements 8 and 9 have moved so far out of the housing 2 that they encounter a resistance due to the vehicle chassis. If a force acts in the reverse direction, deflection of the two rigid housing parts 25 and 26 in relation to each other occurs until the gap between the lower rigid housing part 26 and the graduation in each of the two overload protection elements is closed.

The invention claimed is:

1. A force measuring device, comprising:
    a metal-injection-molded, single-piece metal housing;
    said single-piece metal housing having a rigid upper housing part, a rigid lower housing part, and a plurality of U-shaped spring elements connecting said upper and lower housing parts to one another;
    said spring elements enabling said upper and lower housing parts to be moved elastically relative to one another along a movement axis upon application of a force, and said spring elements being disposed symmetrically to one another parallel to said movement axis and relative to a sectional plane; and
    a deflection sensor mounted between said u the upper and lower rigid housing parts to detect their relative movement in relation to each other;
    said housing including at least four U-shaped spring elements, with a pair of two spring elements respectively pointing in a common direction from said sectional plane; and
    said lower housing part including a securing lug between each said pair of two spring elements, said lugs enabling the force measuring device to be rigidly connected to a motor vehicle chassis.

2. The force measuring device according to claim 1, wherein each one of said U-shaped spring elements has two arms enclosing an acute angle.

3. The force measuring device according to claim 1, wherein each spring element has a wall thickness decreasing from said upper housing part and once more increasing towards a vertex thereof.

4. The force measuring device according to claim 1, wherein said spring elements are curved springs extending from said upper housing part to said lower housing part, and each said spring element has a wall thickness decreasing from said upper housing part and once more increasing towards a vertex of the respective said curved spring.

5. The force measuring device according to claim 1, which further comprises screw bolts adapted to said lugs and configured to attach the force measuring device to the motor vehicle chassis.

6. The force measuring device according to claim 1, wherein said metal-injection-molded, single-piece metal housing is an integral metal part formed in a metal injection molding process by molding a metal powder and subsequently sintering the molded body.

* * * * *